United States Patent
Jiang et al.

(10) Patent No.: US 9,494,356 B2
(45) Date of Patent: *Nov. 15, 2016

(54) CONDENSING UNIT HAVING FLUID INJECTION

(71) Applicant: Emerson Climate Technologies, Inc., Sidney, OH (US)

(72) Inventors: Chao Jiang, Jiangsu (CN); Ying Wang, Anhui (CN)

(73) Assignee: Emerson Climate Technologies, Inc., Sidney, OH (US)

( * ) Notice: Subject to any disclaimer, the term of this patent is extended or adjusted under 35 U.S.C. 154(b) by 483 days.

This patent is subject to a terminal disclaimer.

(21) Appl. No.: 14/025,889

(22) Filed: Sep. 13, 2013

(65) Prior Publication Data

US 2014/0013780 A1  Jan. 16, 2014

Related U.S. Application Data

(63) Continuation of application No. 12/705,030, filed on Feb. 12, 2010, now Pat. No. 8,539,785.

(60) Provisional application No. 61/153,452, filed on Feb. 18, 2009.

(51) Int. Cl.
*F25B 49/02* (2006.01)
*F25B 1/10* (2006.01)

(52) U.S. Cl.
CPC ............... *F25B 49/027* (2013.01); *F25B 1/10* (2013.01); *F25B 2341/0653* (2013.01);
(Continued)

(58) Field of Classification Search
CPC .... F25B 1/10; F25B 49/027; F25B 2400/13; F25B 2600/2509; F25B 2600/2513; F25B 2700/21152; Y02B 30/72

USPC .................................................. 62/222, 225
See application file for complete search history.

(56) References Cited

U.S. PATENT DOCUMENTS 3,738,780 A 6/1973 Edstrom
3,795,117 A 3/1974 Moody, Jr. et al.
(Continued)

FOREIGN PATENT DOCUMENTS

CN 1646866 A 7/2005
CN 1738727 A 2/2006
(Continued)

OTHER PUBLICATIONS

Search Report regarding European Patent Application No. 10744186.7-1605 / 2399083 PCT/US2010024283, dated Jun. 29, 2015.

(Continued)

*Primary Examiner* — Marc Norman
(74) *Attorney, Agent, or Firm* — Harness, Dickey & Pierce, P.L.C.

(57) ABSTRACT

A climate control system is provided and may include a compressor, a first heat exchanger in fluid communication with the compressor, a second heat exchanger in fluid communication with the compressor and the first heat exchanger, and a third heat exchanger disposed between the first heat exchanger and the second heat exchanger and including an inlet and an outlet. A conduit may be fluidly coupled to the third heat exchanger and the compressor and may selectively supply fluid to the compressor. A valve may control a volume of fluid supplied to the compressor via the conduit. A controller may control the valve based on a temperature difference between the outlet of the third heat exchanger and the inlet of the third heat exchanger.

17 Claims, 6 Drawing Sheets

(52) U.S. Cl.
CPC ....... *F25B 2400/13* (2013.01); *F25B 2600/21* (2013.01); *F25B 2600/2509* (2013.01); *F25B 2600/2513* (2013.01); *F25B 2700/21* (2013.01); *F25B 2700/2106* (2013.01); *F25B 2700/21152* (2013.01); *Y02B 30/72* (2013.01)

(56) References Cited

U.S. PATENT DOCUMENTS

| | | | |
|---|---|---|---|
| 3,885,402 A | 5/1975 | Moody, Jr. et al. | |
| 3,913,346 A | 10/1975 | Moody, Jr. et al. | |
| 3,938,349 A * | 2/1976 | Ueno | F25B 13/00 62/192 |
| 4,005,949 A | 2/1977 | Grant | |
| 4,062,199 A | 12/1977 | Kasahara et al. | |
| 4,316,366 A | 2/1982 | Manning | |
| 4,509,341 A | 4/1985 | Zimmern | |
| 4,523,435 A | 6/1985 | Lord | |
| 4,545,742 A | 10/1985 | Schaefer | |
| 4,706,469 A | 11/1987 | Oguni et al. | |
| 4,727,725 A | 3/1988 | Nagata et al. | |
| 4,861,246 A | 8/1989 | Zimmern | |
| 4,899,555 A | 2/1990 | Shaw | |
| 4,903,495 A | 2/1990 | Howland et al. | |
| 4,903,497 A | 2/1990 | Zimmern et al. | |
| 4,947,655 A | 8/1990 | Shaw | |
| 4,974,427 A | 12/1990 | Diab | |
| 5,076,067 A | 12/1991 | Prenger et al. | |
| 5,079,930 A | 1/1992 | Beaverson et al. | |
| 5,095,712 A | 3/1992 | Narreau | |
| 5,214,918 A | 6/1993 | Oguni et al. | |
| 5,224,354 A | 7/1993 | Ito et al. | |
| 5,243,827 A | 9/1993 | Hagita et al. | |
| 5,396,776 A | 3/1995 | Kim | |
| 5,447,420 A | 9/1995 | Caillat et al. | |
| 5,475,985 A | 12/1995 | Heinrichs et al. | |
| 5,582,022 A | 12/1996 | Heinrichs et al. | |
| 5,602,753 A | 2/1997 | Fukui | |
| 5,630,325 A | 5/1997 | Bahel et al. | |
| 5,640,854 A | 6/1997 | Fogt et al. | |
| 5,996,364 A | 12/1999 | Lifson et al. | |
| 6,032,472 A | 3/2000 | Heinrichs et al. | |
| 6,105,378 A | 8/2000 | Shaw | |
| 6,167,722 B1 | 1/2001 | Kasezawa et al. | |
| 6,185,949 B1 | 2/2001 | Madigan | |
| 6,330,805 B1 | 12/2001 | Galian | |
| 6,350,111 B1 | 2/2002 | Perevozchikov et al. | |
| 6,374,631 B1 | 4/2002 | Lifson et al. | |
| 6,385,981 B1 | 5/2002 | Vaisman | |
| 6,405,559 B1 | 6/2002 | Yoneda | |
| 6,428,284 B1 | 8/2002 | Vaisman | |
| 6,438,979 B2 | 8/2002 | Fujita et al. | |
| 6,460,358 B1 | 10/2002 | Hebert | |
| 6,474,087 B1 | 11/2002 | Lifson | |
| 6,571,576 B1 | 6/2003 | Lifson et al. | |
| 6,581,397 B1 | 6/2003 | Taira et al. | |
| 6,718,781 B2 | 4/2004 | Freund et al. | |
| 6,769,264 B2 | 8/2004 | Moon et al. | |
| 6,820,434 B1 | 11/2004 | Gutheim et al. | |
| 6,938,438 B2 | 9/2005 | Lifson et al. | |
| 6,955,059 B2 | 10/2005 | Lifson et al. | |
| 6,973,794 B2 | 12/2005 | Street et al. | |
| 7,114,349 B2 | 10/2006 | Lifson et al. | |
| 7,201,008 B2 | 4/2007 | Lifson et al. | |
| 7,204,099 B2 | 4/2007 | Lifson et al. | |
| 7,290,402 B1 | 11/2007 | Bailey | |
| 7,325,411 B2 | 2/2008 | Bush | |
| 7,360,372 B2 | 4/2008 | Takechi et al. | |
| 7,380,404 B2 | 6/2008 | Kang et al. | |
| 7,386,985 B2 | 6/2008 | Concha et al. | |
| 7,424,807 B2 | 9/2008 | Sienel | |
| 7,523,623 B2 | 4/2009 | Taras et al. | |
| 8,539,785 B2 | 9/2013 | Jiang et al. | |
| 2003/0010046 A1 | 1/2003 | Freund et al. | |
| 2004/0221591 A1 | 11/2004 | Lifson et al. | |
| 2005/0229612 A1 | 10/2005 | Hrejsa et al. | |
| 2005/0235689 A1 | 10/2005 | Lifson et al. | |
| 2006/0010906 A1 | 1/2006 | Taras et al. | |
| 2006/0010908 A1 | 1/2006 | Taras et al. | |
| 2006/0032623 A1 | 2/2006 | Tsubone et al. | |
| 2006/0048539 A1 | 3/2006 | Takechi et al. | |
| 2006/0080989 A1 | 4/2006 | Aoki et al. | |
| 2006/0123840 A1 | 6/2006 | Lifson et al. | |
| 2007/0125102 A1 | 6/2007 | Concha et al. | |
| 2007/0175229 A1 | 8/2007 | Redlich | |
| 2008/0041094 A1 | 2/2008 | Sienel | |
| 2008/0184721 A1 | 8/2008 | Crane et al. | |
| 2008/0229782 A1 | 9/2008 | Takegami et al. | |
| 2009/0007589 A1 | 1/2009 | Takegami et al. | |
| 2009/0071177 A1 | 3/2009 | Unezaki et al. | |
| 2009/0090118 A1 | 4/2009 | Pham et al. | |
| 2014/0208787 A1 * | 7/2014 | Furui | F25B 40/00 62/222 |

FOREIGN PATENT DOCUMENTS

| | | |
|---|---|---|
| CN | 201828077 U | 5/2011 |
| DE | 10159892 A1 | 6/2003 |
| EP | 0842798 A2 | 5/1998 |
| EP | 1492 986 A1 | 1/2005 |
| EP | 2068101 A1 | 6/2009 |
| JP | 3025676 A | 2/1991 |
| JP | 03373904 A | 3/1995 |
| JP | 08006980 A | 1/1996 |
| JP | 2004286266 A | 10/2004 |
| JP | 2006145144 A | 6/2006 |
| KR | 1019920000521 | 1/1992 |
| KR | 20040073325 A | 8/2004 |
| KR | 20050103900 A | 11/2005 |
| WO | 03085335 A1 | 10/2003 |
| WO | 2007121540 A2 | 11/2007 |

OTHER PUBLICATIONS

U.S. Appl. No. 12/705,030, filed Feb. 12, 2010.

Office Action regarding Mexican Patent Application No. MX/a/2011/008766, dated Apr. 11, 2014.

International Search Report regarding International Application No. PCT/US2010/024283, dated Sep. 30, 2010.

Written Opinion of the International Searching Authority regarding International Application No. PCT/US2010/024283, dated Sep. 30, 2010.

Office Action for Israel Patent Application No. 214735, dated Nov. 13, 2012. English translation provided by Ehrlich & Fenster, Patent Attorneys.

First Office Action for Chinese Patent Application No. 201010125184.6, dated Mar. 11, 2013.

Notification of Grounds for Refusal regarding Korean Patent Application No. 10-2011-7019258, dated Apr. 4, 2013. English translation provided by Y.S. Chang & Associates.

Second Office Action for Chinese Application No. 201010125184.6, dated Aug. 19, 2013. English translation provided by Unitalen Attorneys at Law.

* cited by examiner

CONDENSING UNIT HAVING FLUID INJECTION

CROSS-REFERENCE TO RELATED APPLICATIONS

This application is a continuation of U.S. application Ser. No. 12/705,030, filed on Feb. 12, 2010, which claims the benefit of U.S. Provisional Application No. 61/153,452, filed on Feb. 18, 2009. The entire disclosures of the above applications are incorporated herein by reference.

FIELD

The present disclosure relates to a climate control system and more particularly to a climate control system having a fluid-injection system.

BACKGROUND

The statements in this section merely provide background information related to the present disclosure and may not constitute prior art.

Heating and/or cooling systems, including condensing units, heat-pump systems, and other climate control systems may include a compressor, an evaporator, a condenser, and a fluid-injection system. The fluid-injection system may inject refrigerant at a pressure between suction pressure and discharge pressure (i.e., at an intermediate pressure) into an inlet of the compressor, thereby enhancing the performance of the heating and/or cooling system. The fluid-injection system may inject the intermediate-pressure refrigerant into an intermediate inlet of the compressor, which allows the compressor to compress the injected refrigerant to a discharge pressure while passing the injected refrigerant through only a portion of the compressor. While fluid-injection systems enhance system capacity, fluid-injection systems may also be employed to reduce a temperature of discharge gas exiting a compressor.

SUMMARY

This section provides a general summary of the disclosure, and is not a comprehensive disclosure of its full scope or all of its features.

In one configuration, a climate control system is provided and may include a compressor, a first heat exchanger in fluid communication with the compressor, a second heat exchanger in fluid communication with the compressor and the first heat exchanger, and a third heat exchanger disposed between the first heat exchanger and the second heat exchanger and including an inlet and an outlet. A conduit may be fluidly coupled to the third heat exchanger and the compressor and may selectively supply fluid to the compressor. A valve may control a volume of fluid supplied to the compressor via the conduit. A controller may control the valve based on a temperature difference between the outlet of the third heat exchanger and the inlet of the third heat exchanger.

In another configuration, a climate control system is provided and may include a compressor, a first heat exchanger in fluid communication with the compressor, a second heat exchanger in fluid communication with the compressor and the first heat exchanger, and a third heat exchanger disposed between the first heat exchanger and the second heat exchanger and including a first inlet, a first outlet, a second inlet, and a second outlet. A conduit may be fluidly coupled to the second outlet and the compressor and may selectively supply fluid to the compressor. A valve may control a volume of fluid supplied to the compressor via the conduit. A controller may control the valve based on a temperature difference between the second outlet and the second inlet.

Another method is provided and may include measuring a first temperature at an inlet of a heat exchanger, measuring a second temperature at an outlet of a heat exchanger, measuring a discharge temperature of a compressor, and calculating a temperature difference between the first temperature and the second temperature. The method may additionally include calculating a step change of a valve based on the discharge temperature and the temperature difference and adjusting a step of the valve based on the step change.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
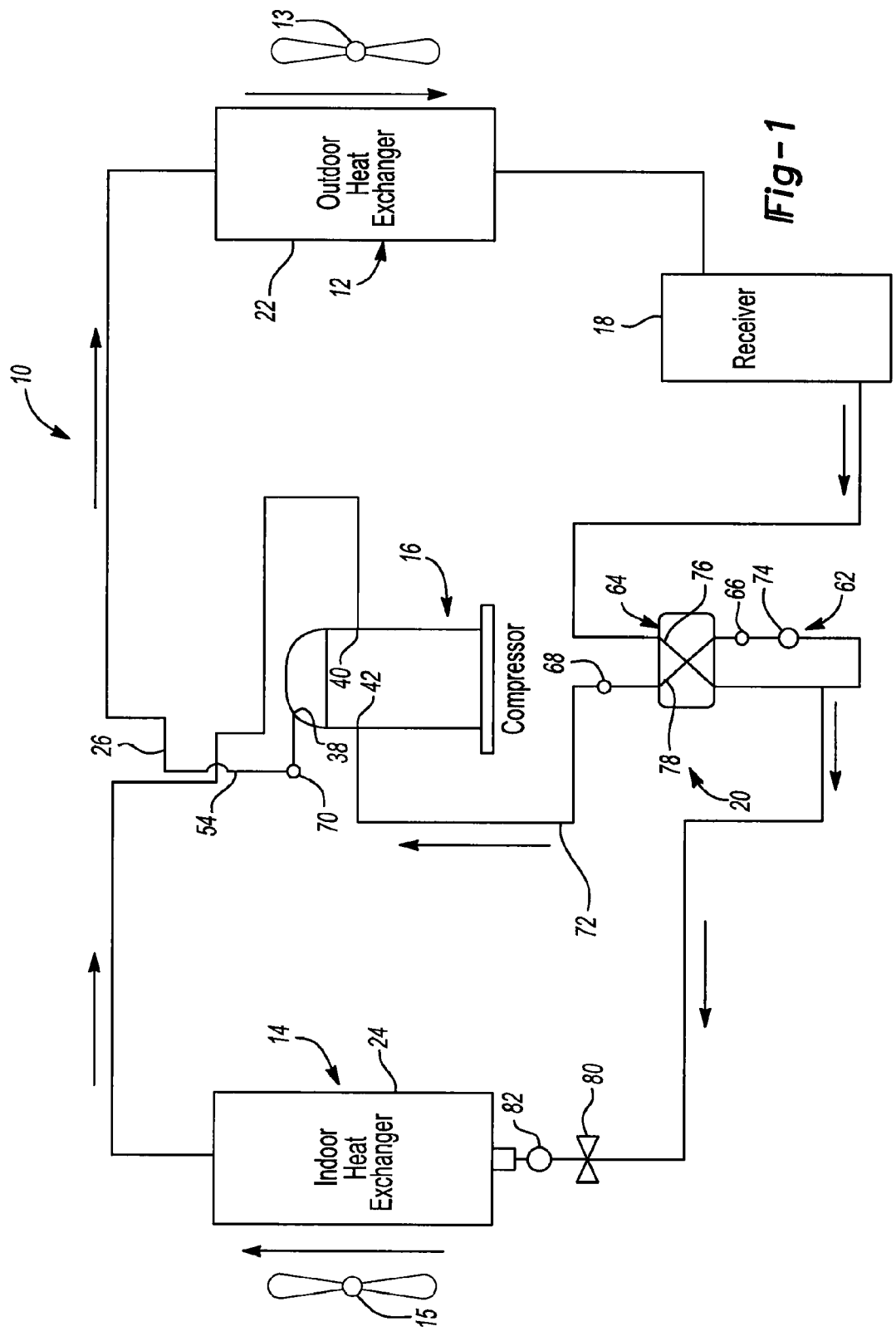
FIG. 1 is a schematic representation of a climate control system incorporating a fluid-injection system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

With reference to FIG. 1, a climate control system 10 is provided and may include an outdoor heat exchanger 12, an indoor heat exchanger 14, a compressor 16, a receiver 18, and a fluid-injection system 20. The outdoor heat exchanger 12 and the indoor heat exchanger 14 are in fluid communication with the compressor 16, the receiver 18 and the fluid-injection system 20 such that a refrigerant may circulate therebetween. The refrigerant cycles through the system 10 under pressure from the compressor 16 and circulates between the outdoor heat exchanger 12 and the indoor heat exchanger 14 to reject and absorb heat.

The outdoor heat exchanger 12 may include a first coil or heat exchanger 22 and a motor-driven fan 13. High-pressure refrigerant may flow from the compressor 16 into the coil 22, where heat is rejected from the coil 22. The outdoor heat exchanger 12 may include a protective housing that encases the coil 22 and fan in such a manner that the fan 13 may draw ambient air across the coil 22 to improve heat transfer and rejection of heat. While a fan 13 is disclosed, any method of transferring heat from the coil 22, such as burying the coil 22 below ground or passing a stream of water around the coil 22, may be used.

The system 10 may include a condensing unit 21 (FIG. 2), which may include a base 23 and a housing 25. The outdoor heat exchanger 12, the compressor 16, the fluid-injection system 20, the receiver 18, an oil separator 27 and an accumulator 29 may be directly or indirectly supported by the base 23 and at least partially enclosed within the housing 25. The housing 25 may include a door and/or a removable access panel 31 to facilitate installation and/or service to the components housed therein.

The indoor heat exchanger 14 may function as an evaporator and may include a coil or heat exchanger 24 and a motor-driven fan 15. The coil 24 and the fan 15 may be enclosed in a cabinet so that the fan 15 forces ambient air across the coil 24. The refrigerant passing through the coil 24 absorbs heat from the air being forced across the coil 24 by the fan 15, thereby cooling the air. The fan 15 subsequently forces the cooled air out of the cabinet and into a space to be cooled by the system 10, such as a room, a refrigerator, or a refrigerated display case, for example.

Referring now to FIGS. 1-4, the compressor 16 may include a generally cylindrical hermetic shell 30 having a cap 32 at a top portion and a base 34 at a bottom portion. The cap 32 and base 34 are fitted to the shell 30 such that an interior volume 36 of the compressor 16 is defined. The cap 32 may include a discharge port 38 while the shell 30 may include a suction port 40 and a fluid-injection port 42, disposed generally between the cap 32 and base 34.

The compressor 16 also includes a motor 44 mounted to the shell 30 that causes relative orbital motion between two meshingly engaged scroll members 46, 48 via a crankshaft 50 and an Oldham coupling 52. The Oldham coupling 52 and its interaction with orbiting scroll members 46, 48 may be of the type disclosed in Assignee's commonly owned U.S. Pat. No. 5,320,506, the disclosure of which is hereby incorporated by reference.

Relative orbital motion between the scroll members 46, 48 draws refrigerant through the suction port 40 and subsequently compresses the refrigerant in at least one moving fluid pocket defined by the scroll members 46, 48. The refrigerant is compressed by the interleaving scroll members 46, 48 as the fluid pockets move from a radially outer position to a central position relative to the scroll members 46, 48, where the compressed refrigerant is exhausted to a discharge chamber 53. The compressed refrigerant is then discharged through the discharge port 38, where it subsequently flows through a discharge line 54 and to the outdoor heat exchanger 12.

Figure 3:
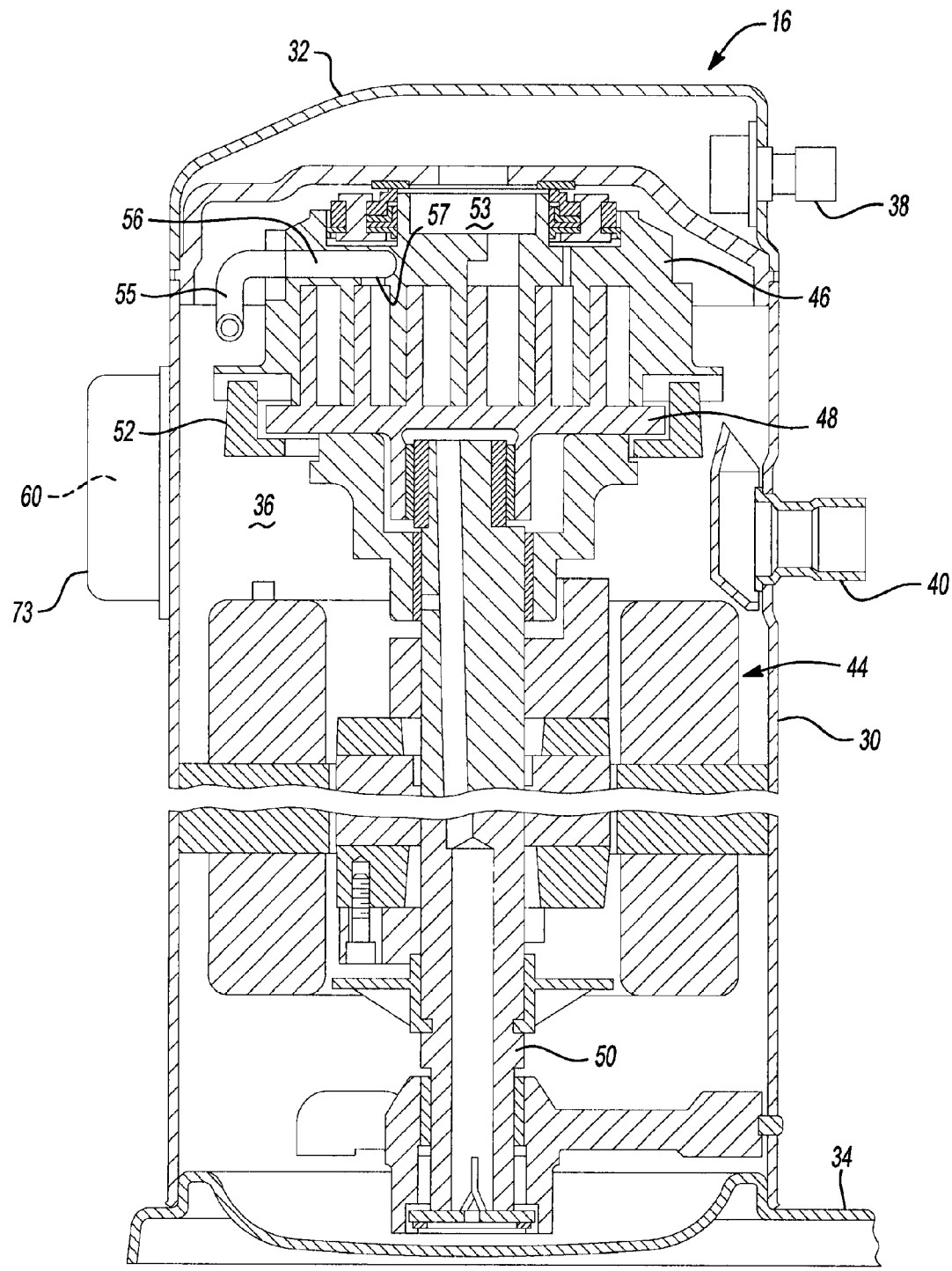
FIG. 3 is a cross-sectional view of a compressor according to the principles of the present disclosure.
Figure 4:
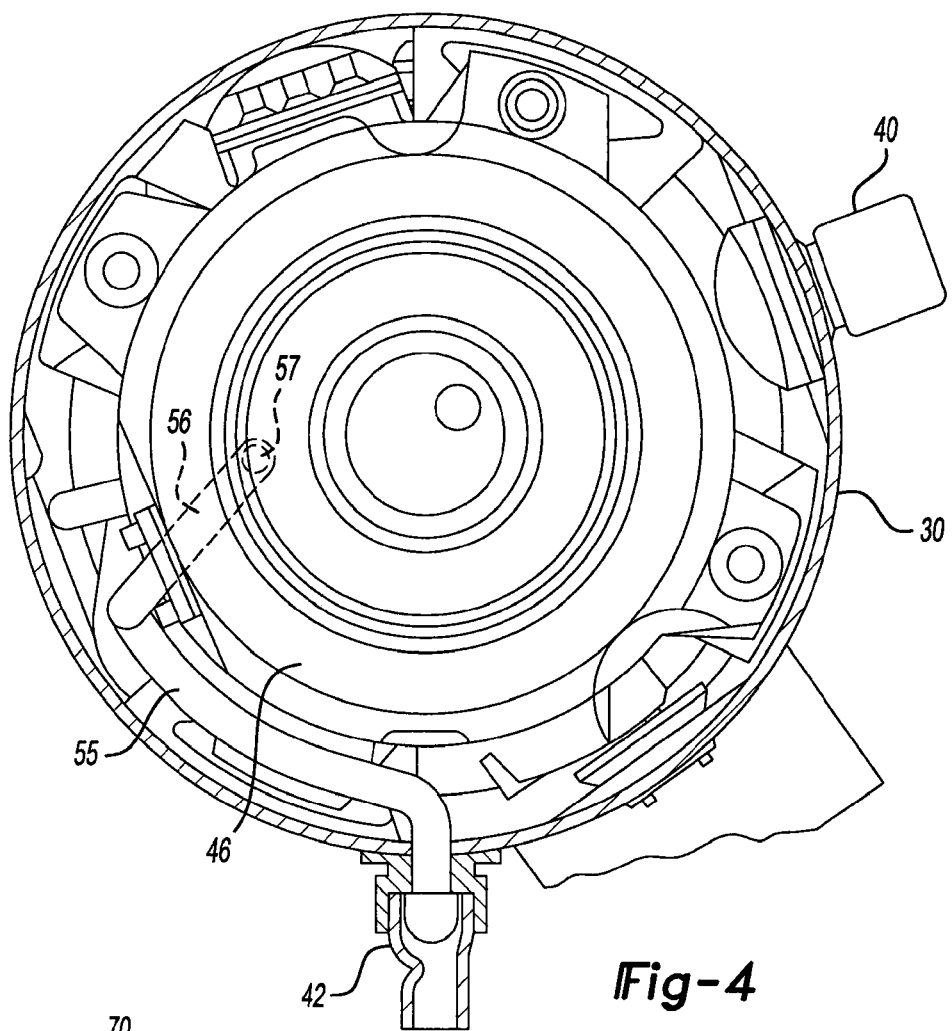
FIG. 4 is a cross-sectional view of the compressor including a fluid-injection passage.

The fluid-injection port 42 may be in fluid communication with the fluid pockets defined by the scroll members 46, 48 via a connecting tube 55 and a fluid passage 56. The connecting tube 55 may be fluidly coupled to the fluid-injection port 42 and the fluid passage 56. The fluid passage 56 may be a cross-drill feed passage extending generally horizontally through the non-orbiting scroll member 46. The fluid passage 56 may include a fluid port 57 providing fluid communication with the moving fluid pockets (FIGS. 3 and 4). The fluid passage 56 may be of the type disclosed in Assignee's commonly owned U.S. Pat. No. 6,619,936, the disclosure of which is hereby incorporated by reference.

Figure 2:
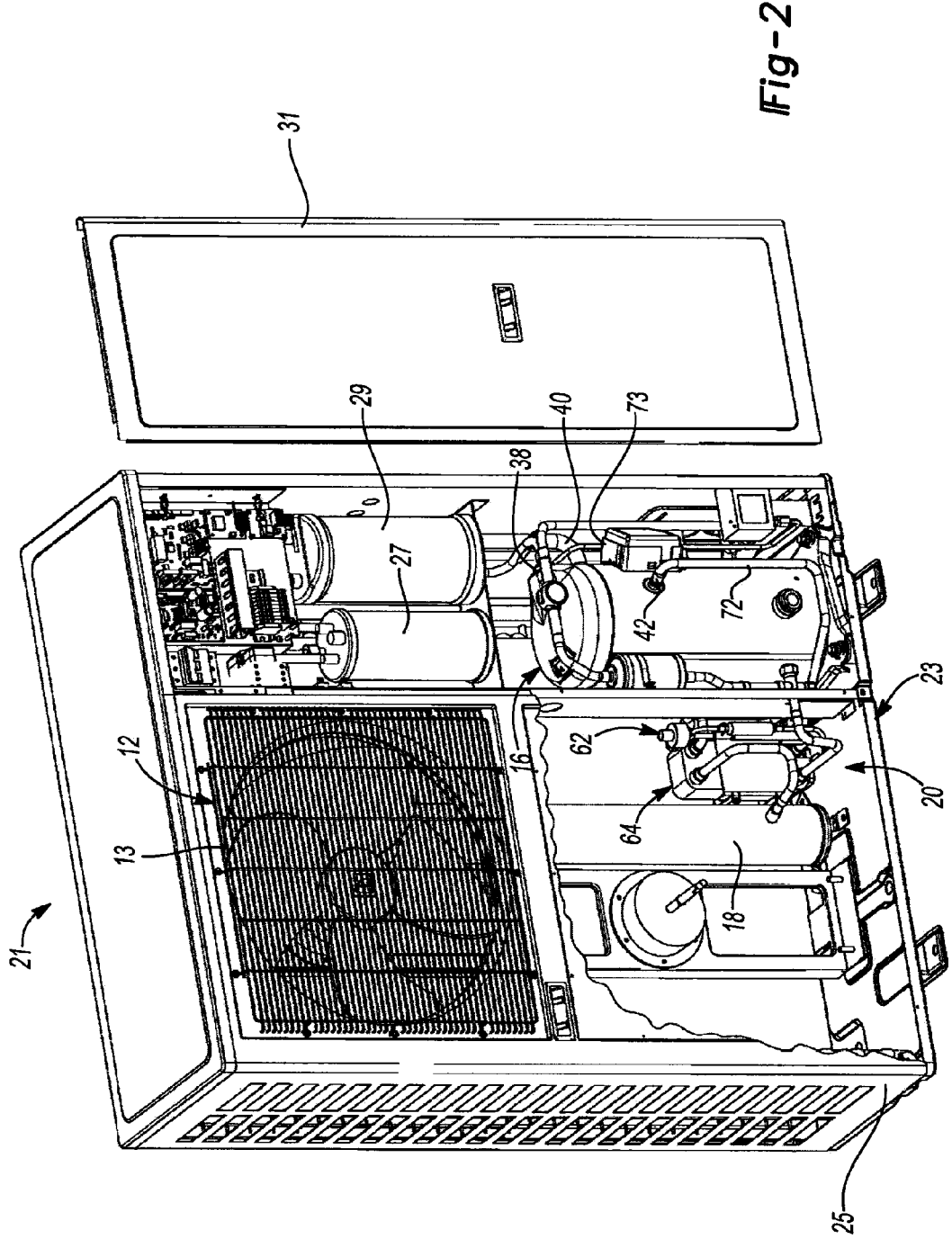
FIG. 2 is a perspective view of a condensing unit according to the principles of the present disclosure.
Figure 5:
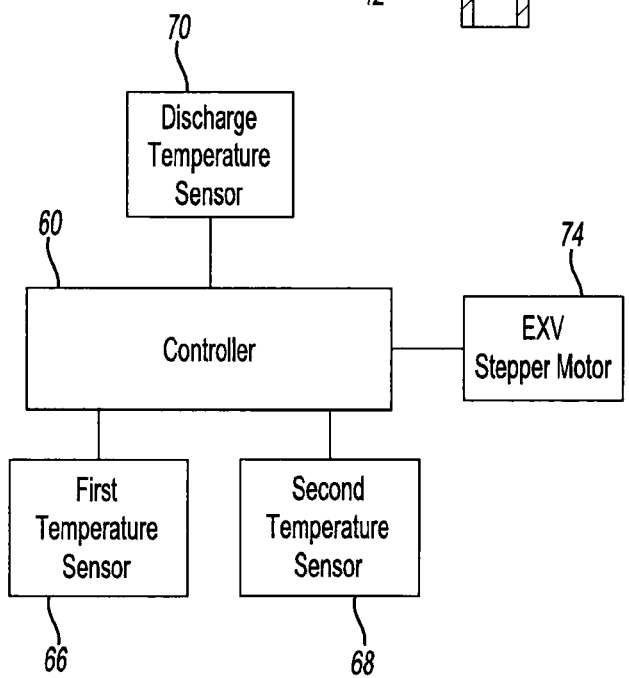
FIG. 5 is a block diagram of a controller in communication with a motor and a plurality of sensors according to the principles of the present disclosure.

Referring now to FIGS. 1, 2 and 5, the fluid-injection system 20 may include a controller 60, an electronic expansion valve or EXV 62, a plate-heat exchanger 64, a first temperature sensor 66, a second temperature sensor 68, a discharge temperature sensor (DT sensor) 70, and a fluid-injection conduit 72 fluidly coupling the fluid-injection system 20 with the fluid-injection port 42 of the compressor 16. The DT sensor 70 measures the temperature of the discharge gas, and therefore, may be disposed on or proximate to the discharge line 54, the discharge chamber 53, the discharge port 38, or any other location that measures a temperature of discharge gas. In one configuration, the DT sensor 70 is disposed about six inches downstream of the discharge port 38.

The controller 60 may be disposed within an enclosure 73 fixed to the compressor 16 (FIG. 3), at any location within the housing 25, or at any other location within the system 10. The controller 60 may be in communication with the EXV 62, the first and second temperature sensors 66, 68 and the DT sensor 70 (FIG. 5). The controller 60 may also be in communication with other sub-systems and/or components of the compressor 16 and/or the system 10 and may control various functions thereof. For example, the controller 60 may control the compressor 16 between an ON state and an OFF state and/or a speed of either or both of fans 13, 15.

The EXV 62 may include a stepper motor 74 in communication with the controller 60, and may be generally configured according to any suitable valve assembly known in the art, such as, for example, an electronic stepper regulator of the type disclosed in assignee's commonly owned U.S. Pat. No. 7,287,396, the disclosure of which is hereby incorporated by reference. The EXV may be positioned proximate to an inlet of the plate-heat exchanger 64, as will be described further below.

The stepper motor 74 may selectively move the EXV 62 between a plurality of positions including a completely closed position, a wide open position, and a plurality of intermediate positions therebetween to control refrigerant flow into the fluid-injection system 20. The controller 60 may selectively cause the stepper motor 74 to move through the plurality of positions based on signals sent to the controller 60 from the first and second temperature sensors 66, 68 and the DT sensor 70, as will be subsequently described.

The plate-heat exchanger 64 may include a liquid-side coil 76 and a vapor-side coil 78. The liquid-side coil 76 may be in fluid communication with the receiver 18, the EXV 62, and the indoor heat exchanger 14. Liquid refrigerant may flow from the receiver 18 and through the liquid-side coil 76, where heat is rejected and the liquid refrigerant is cooled. Upon exiting the liquid-side coil 76, a first portion of the liquid refrigerant may flow through a solenoid valve 80 and an expansion device 82 where the liquid refrigerant changes to a liquid-vapor mixture before entering the indoor heat exchanger 14. The expansion device 82 may be a thermal expansion valve, an electronic expansion valve, a capillary tube, an orifice tube, or an expander, for example.

The solenoid valve 80 may be used to control fluid flow through the system 10. For example, when a cooling cycle of the system 10 ends (i.e., the space being cooled by the system 10 has reached a pre-set temperature), the valve 80 may close to prevent fluid upstream of the valve 80 from flowing into the indoor heat exchanger 14. The compressor 16 may continue to pump some or all of the fluid downstream of the valve 80 out of the indoor heat exchanger 14, through the outdoor heat exchanger 12, and into the receiver 18, for example. In this manner, the valve 80 may prevent fluid migration through the indoor heat exchanger 14 after the cooling cycling of the system 10 ends.

A second portion of the liquid refrigerant exiting the liquid-side coil 76 may flow to the EXV 62, which may be in the closed, intermediate or wide open position, as described above, thereby prohibiting, restricting, or allowing the refrigerant to flow therethrough. The EXV 62 may therefore be disposed between an outlet of the liquid-side coil 76 and an inlet of the vapor-side coil 78 and may be disposed proximate to the first temperature sensor 66.

Refrigerant that is allowed to pass through the EXV 62 may flash into a wet vapor or liquid-vapor mixture. The first temperature sensor 66 may sense a temperature of the liquid-vapor mixture and send a signal to the controller 60, thereby communicating the temperature of the liquid-vapor mixture to the controller 60. The liquid-vapor mixture may then pass through the vapor-side coil 78, cooling the liquid-side coil 76 and the liquid refrigerant flowing therethrough. The low temperature liquid-vapor mixture passing through the vapor-side coil 78 provides additional cooling capacity for the plate-heat exchanger 64 and sub-cools the refrigerant flowing from the plate-heat exchanger 64 to the indoor heat exchanger 14. Other types of heat exchangers could be substituted for the plate-heat exchanger 64. Accordingly, the principles of the present disclosure are not limited to embodiments having a plate-heat exchanger.

Upon exiting the vapor-side coil 78, the second temperature sensor 68 may sense a temperature of the refrigerant in the fluid-injection conduit 72 and send a signal to the controller 60, thereby communicating the temperature of the refrigerant to controller 60. As described above, the fluid-injection conduit 72 may be in communication with the fluid-injection port 42 and fluid passage 56, through which fluid may be injected into the fluid pocket defined by the scroll members 46, 48. The fluid injected into the compressor 16 may be a vapor, a liquid or a liquid-vapor mixture. The fluid may be at an intermediate pressure, which is greater than a system suction pressure but less than a system discharge pressure.

Figure 6:
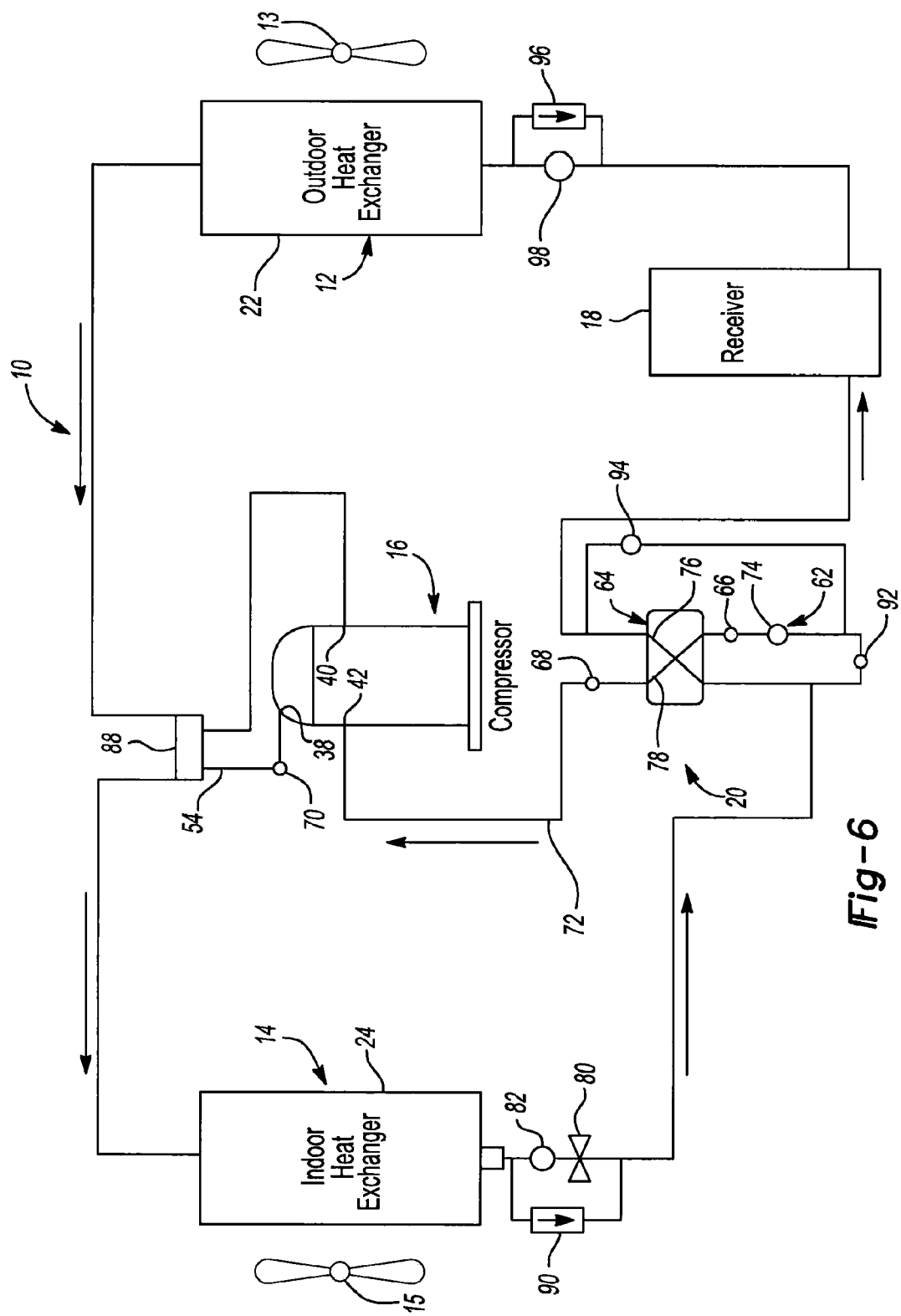
FIG. 6 is a schematic representation of a heat-pump system operable in a COOL mode and a HEAT mode and incorporating a fluid-injection system according to the principles of the present disclosure.

Referring now to FIG. 6, while the climate control system 10 is described above as a cooling system, the climate control system 10 can be a heat-pump system operable in a HEAT mode and a COOL mode. In this embodiment, the system 10 may include a four-way valve 88, a first check valve 90, a first valve 92, a second valve 94, a second check valve 96, and an expansion device or capillary 98. In the HEAT mode, the functions of the outdoor and indoor heat exchangers 12, 14 are switched, i.e., the coil 24 of the indoor heat exchanger 14 will function as a condenser and the coil 22 of the outdoor heat exchanger 12 will function as an evaporator. The four-way valve 88 can be switched between a COOL mode and a HEAT mode.

In the HEAT mode, the coil 24 receives high-pressure refrigerant from the compressor 16. The refrigerant rejects heat to the ambient air as it passes through the coil 24, thereby heating the ambient air. The fan 15 may force the heated air into a space to be heated by the system 10. Refrigerant flowing from the indoor heat exchanger 14 may flow through the first check valve 90 and bypass the expansion device 82. The first valve 92 may be closed in the HEAT mode such that the refrigerant is forced through the liquid-side coil 76. The second valve 94 may be open in the HEAT mode to allow a first portion of the refrigerant to flow towards the EXV 62, while a second portion may flow through the receiver 18 and the expansion device or capillary 98 and into the outdoor heat exchanger 12.

In the COOL mode, the coil 22 receives high-pressure refrigerant from the compressor 16. Refrigerant flowing from the outdoor heat exchanger 12 may flow through the second check valve 96, bypassing the expansion device or capillary 98 before flowing through the receiver 18. In the COOL mode, the second valve 94 may be closed such that the refrigerant is forced through the liquid-side coil 76. The first valve 92 may be open in the COOL mode to allow a first portion of the refrigerant to flow towards the EXV 62, while a second portion may flow towards to the expansion device 82 and indoor heat exchanger 14.

With reference to FIGS. 1-7, operation of the climate control system 10 will be described in detail. As described above, refrigerant circulates through the climate control system 10 to cool a space, such as a room, a refrigerator, or a supermarket display case, for example. When the system 10 is operating as a cooling system, a portion of the refrigerant flowing from the receiver 18 may flow into the fluid-injection system 20, while the remainder of the refrigerant may flow toward the indoor heat exchanger 14. When the system 10 is operating as a heating system, a portion of the refrigerant flowing from the indoor heat exchanger 14 may flow into the fluid-injection system 20, while the remainder of the refrigerant may flow toward the outdoor heat exchanger 12. The amount of refrigerant that is allowed to flow into the fluid-injection system 20 may be dependent upon a position of the stepper motor 74 of the EXV 62.

Figure 7:
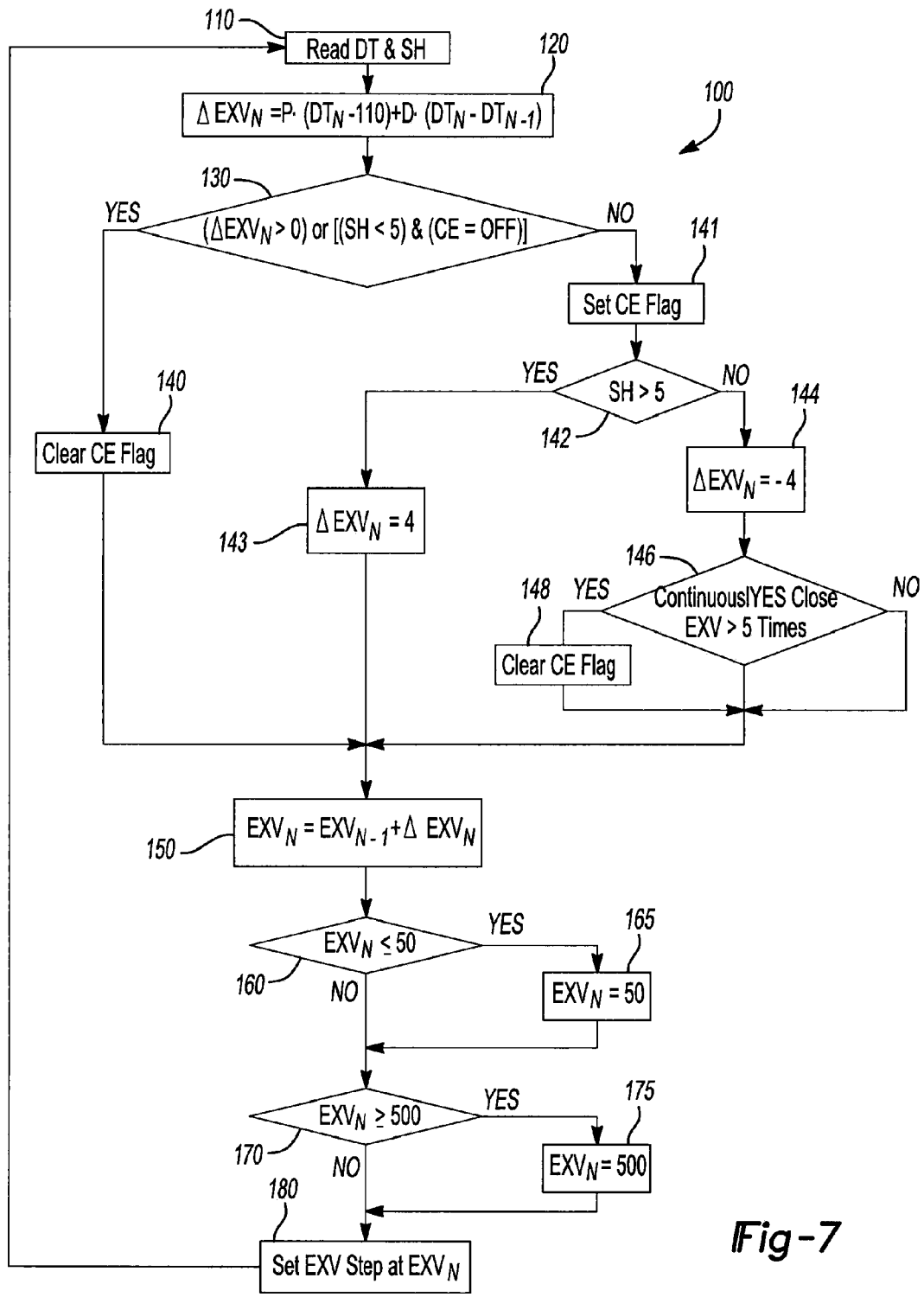
FIG. 7 is a flowchart illustrating a control algorithm of the fluid-injection system according to the principles of the present disclosure.

The controller 60 may control the position of the stepper motor 74 according to a control algorithm 100 (FIG. 7). The control algorithm 100 may adjust the position of the stepper motor 74 to variably open or close the EXV 62 based on one or more operating conditions of the system 10. The operating conditions may include a discharge temperature (DT) and a vapor-side super heat (SH) of the plate-heat exchanger 64, whereby each of the discharge temperature and the super heat can be controlled by controlling a single valve (i.e., EXV 62).

The discharge temperature may be measured by the DT sensor 70 disposed proximate the discharge port 38. The vapor-side super heat may be calculated as a difference between a vapor-out temperature (VOT) of the refrigerant and a vapor-in temperature (VIT) of the refrigerant, i.e., SH=VOT−VIT. The vapor-out temperature may be measured by the second temperature sensor 68, which may be disposed proximate an outlet of the vapor-side coil 78 of the plate-heat exchanger 64. The vapor-in temperature may be measured by the first temperature sensor 66, which may be disposed proximate an inlet of the vapor-side coil 78 of the plate-heat exchanger 64.

With particular reference to FIGS. 1, 6 and 7, the logic of the control algorithm 100 will be described in detail. The control algorithm 100 may repeatedly determine an optimal position of the stepper motor 74 at a predetermined frequency, such as every twenty seconds, for example, to optimize the performance of the compressor 16 and/or system 10. For every repetition N of the control algorithm 100, the optimal position ($EXV_N$) of the stepper motor 74 may be calculated.

The control algorithm 100 may include a capacity enhancement (CE) mode, which may be selectively activated and deactivated by setting and clearing a CE flag, respectively. When the capacity enhancement mode is on, the control algorithm 100 may adjust the position of the EXV 62 according to the vapor-side super heat to optimize the performance, capacity, and efficiency of the compressor 16 and/or the system 10 while the system 10 is operating in a low compression ratio condition. When the capacity enhancement mode is off, a priority of the control algorithm 100 is to lower the discharge temperature to minimize a risk of damage to the compressor 16. Accordingly, during a high compression ratio condition, the controller 60 may cause the EXV 62 to allow a greater amount of refrigerant into the fluid-injection conduit 72 to be injected into the compressor 16. In the wide-open position, the EXV 62 may allow wet vapor to be injected into the compressor 16, which may further reduce the discharge temperature. The control algorithm 100 can therefore control both the discharge temperature of the compressor 16 as well as the super heat (SH) of the plate-heat exchanger 64 by controlling a single expansion valve (i.e., EXV 62).

The control algorithm 100 allows for smooth and timely activation and deactivation of the capacity enhancement mode, thereby avoiding "hunting." The expansion device is deemed to be "hunting" when the valve continuously modulates its position (i.e., "hunting" for a steady-state position).

With continued reference to FIG. 7, the control algorithm 100 is initiated at block 110, and may include measuring the discharge temperature, vapor-out temperature and vapor-in temperature, and communicating those values to the controller 60. The controller 60 may then determine the vapor-side super heat from the vapor-out temperature and vapor-in temperature values, as described above.

At block 120, the controller 60 may calculate a step change $\Delta EXV_N$, which is the number of steps in which the stepper motor 74 moves to open or close the EXV 62. The step change $\Delta EXV_N$ may be calculated according to the following equation, where N denotes an $N^{th}$ repetition of the control algorithm 100; N−1 denotes a repetition immediately preceding the $N^{th}$ repetition; P is a proportion gain constant; D is a differential gain constant; $DT_N$ is the $N^{th}$ discharge temperature measurement communicated to the controller 60 at Block 110; and $DT_{N-1}$ is a discharge temperature measurement immediately preceding $DT_N$, i.e., the DT measurement communicated to the controller 60 for a step change N−1, which is the step change immediately preceding the $N^{th}$ step change ($\Delta EXV_N$):

$$\Delta EXV_N = P^*(DT_N - 110) + D^*(DT_N - DT_{N-1})$$

A positive step change $\Delta EXV_N$ value may be an opening step change, causing the EXV 62 to move toward the wide-open position, thereby allowing a greater amount of refrigerant into the fluid-injection system 20. A negative step change $\Delta EXV_N$ value may be a closing step change, thereby causing the EXV 62 to move toward the fully closed position and allowing less refrigerant into the fluid-injection system 20.

The proportion gain of the equation of block 120 is a coefficient, which relates to the level of sensitivity of the system 10 to a deviation between the measured discharge temperature and an optimal discharge temperature (e.g., 110 degrees Celsius). The differential gain is a coefficient that relates to the level of sensitivity of the system 10 to a deviation between two consecutive discharge temperature measurements. For example, if the performance and/or durability of the system 10 is highly sensitive to relatively minor deviations in discharge temperature, the proportion and differential gains may be smaller values to increase the step change value, thereby causing a smaller adjustment in the position of the EXV 62 and the amount of refrigerant that is allowed to enter the fluid-injection system 20. Exemplary values of the proportion gain and differential gain may be one for a single-fan system and two for a double-fan system. System testing and other optimization methods may be employed to determine proportion and differential gain values.

At block 130, the controller 60 may determine whether the step change N ($\Delta EXV_N$) is greater than zero or whether the vapor-side super heat (SH) is less than five degrees and the capacity enhancement mode is off (i.e., the CE flag is off). If either or both of the first and second conditions are satisfied, the control algorithm 100 may proceed to block 140.

At block 140, the CE flag may be cleared, thereby turning the capacity enhancement mode off. From block 140, the control algorithm 100 may proceed to block 150 where the position of the stepper motor 74 may be determined, which, in turn, may determine the position of the EXV 62.

If neither of the first and second conditions of block 130 are satisfied, the control algorithm 100 may proceed to block 141. At block 141, the CE flag is set, thereby turning the capacity enhancement mode on. At block 142, the controller 60 may determine whether the vapor-side super heat (determined at block 110) is greater than a predetermined super heat value, such as five degrees Celsius, for example. If so, the control algorithm 100 may proceed to block 143, where the step change $\Delta EXV_N$ may be set to a predetermined opening step change value, such as four steps open, for example. The control algorithm 100 may then proceed to block 150.

Referring again to block 142, if the vapor-side super heat is not greater than the predetermined super heat value (e.g., five degrees Celsius), the control algorithm 100 may proceed to block 144, where the step change $\Delta EXV_N$ may be set to a predetermined closing step change value, such as minus four, for example.

While an exemplary superheat value of five is recited above, the predetermined superheat value of block 142 can be customized for any given climate control system and/or any application of a given climate control system. The predetermined superheat value can be selected to optimize the capacity, efficiency, and/or performance of the compressor 16 and/or the system 10. Testing, computer-aided engineering (CAE) software, and/or other optimization methods may be employed to determine an optimal super heat value.

Similarly, the predetermined opening step change value and the predetermined closing step change value of blocks 143 and 144, respectively, may be customized for a given climate control system and/or application. These values may be determined to optimize the performance, capacity, and efficiency of the compressor 16 and/or system 10.

At block 146, the controller 60 may determine whether the stepper motor 74 has made a closing step for more than a predetermined number of consecutive repetitions of the control algorithm 100. In the particular embodiment illustrated in FIG. 7, the controller determines whether the stepper motor 74 has made five consecutive closing steps. If so, the CE flag may be cleared at block 148 to allow the EXV 62 to reach an optimal position over fewer repetitions of the control algorithm 100. If not, the control algorithm 100 may proceed directly to block 150.

At block 150, the position of the stepper motor 74 may be determined by the following equation, where $EXV_N$ is the position of the stepper motor 74 at the $N^{th}$ repetition of the control algorithm 100, $EXV_{N-1}$ is an immediately preceding position of the stepper motor 74, and $\Delta EXV_N$ is the $N^{th}$ step change calculated at block 120, block 143 or block 144:

$$EXV_N = EXV_{N-1} + \Delta EXV_N$$

A minimum value of $EXV_N$ may correspond to the fully closed position of the EXV 62. For example, $EXV_N$=fifty (50) may be the minimum value, which corresponds to the fully closed position. Therefore, at block 160, the controller 60 may determine whether the $EXV_N$ value calculated at block 150 is less than fifty. If so, $EXV_N$ set to fifty (the minimum value) at block 165.

A maximum value of $EXV_N$ may correspond to the wide-open position of the EXV 62. For example, $EXV_N$=five hundred (500) may be the maximum value, which corresponds to the wide-open position. Accordingly, block 170 may determine whether the $EXV_N$ value calculated at block 150 is greater than five hundred. If so, $EXV_N$ is set to five hundred (the maximum value) at block 175. Any other values of $EXV_N$ between the minimum and maximum values may correspond to the plurality of positions of the stepper motor 74 between the fully-closed position and the wide-open position.

At block 180, the controller 60 may send a signal to the stepper motor 74, which may cause the stepper motor 74 to move to the position corresponding to the value of $EXV_N$ determined by the steps of the control algorithm 100. The control algorithm 100 may then start over at block 110 and repeat the steps described above.

The control algorithm 100 described above may improve the performance and efficiency of the compressor 16 and/or the system 10 over a broad range of operating conditions. For example, under high compression ratio conditions, the discharge temperature may rise above an optimal or safe temperature (e.g., 110 degrees Celsius), for example. The capacity-enhancement mode may be turned off, which may allow the EXV 62 to rapidly approach the wide-open position. In wide-open and near wide-open positions, wet vapor (liquid-vapor mixture) may be injected into the compressor 16, which may substantially reduce the discharge temperature. Once the discharge temperature returns to the optimum level, the control algorithm 100 may cause the EXV 62 to move away from the wide-open position and toward the closed position. In so doing, the amount of wet vapor injected into the compressor 16 is reduced and the efficiency of the compressor 16 is increased. With the discharge temperature at or below the predetermined safe temperature (e.g., 110 degrees Celsius), the control algorithm 100 may cause the EXV 62 to at least partially close to reduce the amount of wet vapor injected into the compressor 16 to maximize compressor efficiency.

Under low compression ratio conditions, the discharge temperature may be at or below the predetermined safe temperature. Accordingly, the enhancement mode may be activated. The control algorithm 100 may then control the position of the EXV 62 based on the vapor-side super heat to maximize the efficiency and performance of the compressor 16 and/or the system 10.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A climate control system comprising:
   a compressor;
   a first heat exchanger in fluid communication with said compressor;
   a second heat exchanger in fluid communication with said compressor and said first heat exchanger;
   a third heat exchanger disposed between said first heat exchanger and said second heat exchanger and including an inlet and an outlet;
   a conduit fluidly coupled to said third heat exchanger and said compressor and operable to selectively supply fluid to said compressor;

a valve operable to control a volume of fluid supplied to said compressor via said conduit; and a controller operable to control said valve based on a temperature difference between said outlet of said third heat exchanger and said inlet of said third heat exchanger.

2. The climate control system of claim 1, further comprising a discharge temperature sensor operable to sense a discharge temperature of said compressor, said controller operable to control said valve based on said temperature difference and said discharge temperature.

3. The climate control system of claim 1, further comprising a first temperature sensor disposed proximate to said inlet of said third heat exchanger and a second temperature sensor disposed proximate to said outlet of said third heat exchanger, said controller operable to determine said temperature difference based on information from said first temperature sensor and said second temperature sensor.

4. The climate control system of claim 1, wherein said third heat exchanger includes a liquid-side coil and a vapor-side coil.

5. The climate control system of claim 4, wherein said inlet is an inlet of said vapor-side coil and said outlet is an outlet of said vapor-side coil.

6. The climate control system of claim 4, wherein said temperature difference is measured across said vapor-side coil.

7. A climate control system comprising:
a compressor;
a first heat exchanger in fluid communication with said compressor;
a second heat exchanger in fluid communication with said compressor and said first heat exchanger;
a third heat exchanger disposed between said first heat exchanger and said second heat exchanger and including a first inlet, a first outlet, a second inlet, and a second outlet;
a conduit fluidly coupled to said second outlet and said compressor and operable to selectively supply fluid to said compressor;
a valve operable to control a volume of fluid supplied to said compressor via said conduit; and
a controller operable to control said valve based on a temperature difference between said second outlet and said second inlet.

8. The climate control system of claim 7, further comprising a discharge temperature sensor operable to sense a discharge temperature of said compressor, said controller operable to control said valve based on said temperature difference and said discharge temperature.

9. The climate control system of claim 7, further comprising a first temperature sensor disposed proximate to said second inlet and a second temperature sensor disposed proximate to said second outlet, said controller operable to determine said temperature difference based on information from said first temperature sensor and said second temperature sensor.

10. The climate control system of claim 7, wherein said third heat exchanger includes a liquid-side coil and a vapor-side coil.

11. The climate control system of claim 10, wherein said second inlet is an inlet of said vapor-side coil and said second outlet is an outlet of said vapor-side coil.

12. The climate control system of claim 10, wherein said temperature difference is measured across said vapor-side coil.

13. A system comprising:
a compressor having a suction port, a fluid-injection port and a discharge port;
a heat exchanger in fluid communication with said compressor;
a conduit fluidly coupled to said heat exchanger and said compressor and operable to selectively supply fluid to said compressor via said fluid-injection port;
a valve operable to control a volume of fluid supplied to said compressor via said conduit; and
a controller operable to control said valve based on a discharge temperature of said compressor and a temperature difference across said heat exchanger.

14. The system of claim 13, wherein said heat exchanger includes a first inlet, a first outlet, a second inlet, and a second outlet, said second outlet coupled to said conduit, and wherein said controller determines said temperature difference by subtracting a temperature at said second inlet from a temperature at said second outlet.

15. The system of claim 13, wherein said heat exchanger includes a liquid-side coil and a vapor-side coil.

16. The system of claim 15, wherein said second inlet is an inlet of said vapor-side coil and said second outlet is an outlet of said vapor-side coil.

17. The system of claim 13, wherein said heat exchanger is a plate-heat exchanger.

* * * * *